(12) United States Patent
Bulusu et al.

(10) Patent No.: US 12,020,222 B1
(45) Date of Patent: Jun. 25, 2024

(54) APPARATUSES, METHODS, AND COMPUTER PROGRAM PRODUCTS FOR EVENT-BASED PAYMENT ORCHESTRATION

(71) Applicant: Wells Fargo Bank, N.A., San Francisco, CA (US)

(72) Inventors: Ramanand Bulusu, Hyderabad (IN); Saurabh Baranwal, Hyderabad (IN); Srikanth Pasala, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 31 days.

(21) Appl. No.: 18/056,009

(22) Filed: Nov. 16, 2022

Related U.S. Application Data

(60) Provisional application No. 63/282,788, filed on Nov. 24, 2021.

(51) Int. Cl.
*G06Q 20/10* (2012.01)
*G06Q 20/32* (2012.01)

(52) U.S. Cl.
CPC ........... *G06Q 20/10* (2013.01); *G06Q 20/325* (2013.01)

(58) Field of Classification Search
CPC .............................. G06Q 20/10; G06Q 20/325
USPC ..................................................... 705/35, 39
See application file for complete search history.

(56) References Cited

U.S. PATENT DOCUMENTS

| | | | | |
|---|---|---|---|---|
| 11,720,865 B2* | 8/2023 | Ng | ........................ | G06Q 20/405 705/39 |
| 2010/0268612 A1* | 10/2010 | Berrio | ..................... | G06Q 20/40 705/16 |
| 2014/0158759 A1* | 6/2014 | Smets | ................. | G06Q 20/3552 235/379 |
| 2022/0300917 A1* | 9/2022 | Wied | .................... | G06Q 20/027 |
| 2023/0102756 A1* | 3/2023 | Park | ........................ | G06Q 20/34 705/39 |

* cited by examiner

*Primary Examiner* — William E Rankins
(74) *Attorney, Agent, or Firm* — K&L Gates LLP

(57) ABSTRACT

Methods, apparatuses, and computer program products for event-based payment orchestration are provided. An example method includes receiving, via an orchestrator device, a request for a payment process configuration from a first participant device. The orchestrator device includes a plurality of payment process configurations stored locally by the orchestrator device, each of the plurality of payment process configurations include configurable instructions for performing an associated portion of a payment process, and the request includes a plurality of first participant requirement parameters. The method includes determining a first payment process configuration based upon the plurality of participant requirement parameters and providing the first payment process configuration to the first participant device. Modifications to the first payment process configuration by the first participant device are stored locally by the first participant device.

20 Claims, 8 Drawing Sheets

APPARATUSES, METHODS, AND COMPUTER PROGRAM PRODUCTS FOR EVENT-BASED PAYMENT ORCHESTRATION

CROSS REFERENCE TO RELATED APPLICATIONS

This application claims the benefit of U.S. Provisional Application No. 63/282,788, filed Nov. 24, 2021, which is hereby incorporated by reference in its entirety.

TECHNOLOGICAL FIELD

Example embodiments of the present disclosure relate generally to payment systems and, more particularly, to the use of payment process configurations for payment processing orchestration.

BACKGROUND

Many businesses, enterprises, financial institutions, and other entities rely upon various workflow configurations in the normal course of operation. For example, financial institutions may manage a plurality of various business units, vendors, product lines, and other participants that may collectively complete a payment operation. These various participants may be subject to differing operational constraints, customer requirements, and/or the like such that the workflow or process approach amongst differing participants varies.

BRIEF SUMMARY

As described above, many entities rely upon various workflow configurations to perform their intended function, such as financial institutions. For example, a financial institution may complete various payment processes as part of its normal operations of servicing its customers. Such a payment process may include various independent participants that, for example, perform portions or tasks of the payment process. By way of example, a payment process (e.g., wire transfer, automated clearing house (ACH) transaction, or the like) may include numerous participants that perform verification tasks, payment routing tasks, account identification tasks, etc. that may be, simultaneously or sequentially, performed in order to effectuate the payment process. Each payment process may further be customer or vendor specific such that the portion of the payment process completed by this participant may include various participant requirements as defined by associated vendors, customers, etc. Still further, various participants may require outputs from other participants in order to successfully complete their associated functions (e.g., an output from one participant device may serve as an input to another participant device).

Conventional systems and methods for completing a payment process or otherwise completing a workflow configuration often rely upon disparate systems that, as described above, are particularly defined for completing processes for particular customers or subject to specific vendor parameters. As such, interfacing between these participants requires a central system to not only provide data between devices but further to store the various specific parameters associated with the particular customers or vendors. In this way, traditional systems are often subjected to local storage burdens that substantially limit the system's ability to efficiently address payment configuration modifications or improvements, identify error sources, and/or the like. Furthermore, modifications to a traditional central system often require subsequent modification of operation parameters associated with each of the participant devices that rely upon this central system for payment process configurations.

To solve these issues and others, example implementations of embodiments of the present disclosure may leverage an orchestrator device that locally stores only a plurality of payment process configurations (e.g., base configurations), each of which include configuration instructions for performing an associated portion of a payment process. In response to a request for a payment process configuration by an example participant device that includes participant requirement parameters, the orchestrator device may determine an associated payment process configuration based upon these participant requirement parameters and provide an associated process configuration to the participant device. Any modifications to the payment process configuration by the participant device, such as to comply with applicable customer, business, or vendor requirements are stored locally by the participant device. In this way, the plurality of payment process configurations stored locally by the orchestrator device may remain unchanged in response to customer specific modifications thereby reducing the storage burden associated with the orchestrator device. Furthermore, upon detection of an error in the payment process configuration, the orchestrator device may access data stored locally by one or more participant devices to appropriately determine the source of the error without compromising operations of other participant devices.

In this way, the inventors have identified that the advent of computing resources have created a new opportunity for solutions for payment processing which were historically unavailable. In particular, the embodiments herein may operate to address several technical challenges that result in improvements to the fundamental operation of computing systems of an example financial institution. As described above and hereafter, the embodiments of the present disclosure may operate to reduce the memory and, by association, processing burdens of a centralized device (e.g., an orchestrator device) by selectively storing payment process configuration data that is modified for specific customers, vendors, businesses, etc. locally on the participant device that performs the function associated with the particular payment process. In doing so, the embodiments described herein provide a lightweight and agile orchestrator device that provides efficient modification of payment process configurations without impact to particular participant configurations and further facilitates identification of error occurrences.

Systems, apparatuses, methods, and computer program products are disclosed herein for event-based payment orchestration. In one embodiment, with reference to an example computer-implemented method, a method for event-based payment orchestration is provided. The method may include receiving, via an orchestrator device, a request for a payment process configuration from a first participant device. The orchestrator device may include a plurality of payment process configurations stored locally by the orchestrator device, and each of the plurality of payment process configurations may include configurable instructions for performing an associated portion of a payment process. The request may include a plurality of first participant requirement parameters. The method may include determining a first payment process configuration based upon the plurality of participant requirement parameters and providing the first payment process configuration to the first participant device. Modifications to the first payment process configuration by the first participant device are stored locally by the first participant device.

In some embodiments, the method may include modifying one or more of the plurality of payment process configurations stored locally by the orchestrator device and determining if the modification implicates the first payment process configuration. The method may further include transmitting a modification notification to the first participant device in an instance in which the modification implicates the first payment process configuration.

In some embodiments, the method may further include receiving a request for a payment process configuration from a second participant device where the request includes a plurality of second participant requirement parameters and determining a second payment process configuration based upon the plurality of second participant requirement parameters. The method may further include providing the second payment process configuration to the second participant device. Modifications to the second payment process configuration by the second participant device may be stored locally by the second participant device.

In some further embodiments, the method may include receiving an error notification associated with a payment process that includes operations by the first participant device and the second participant device, accessing first operation data stored locally by the first participant device, and accessing second operation data stored locally by the second participant device. The method may include determining an error source in either the first payment process configuration of the first participant device or the second payment process configuration of the second participant device based upon the first operation data and the second operation data.

In some still further embodiments, the method may include modifying one or more of the plurality of payment process configurations stored locally by the orchestrator device based upon the determined error source.

In some embodiments, the method may further include modifying one or more of the plurality of payment process configurations stored locally by the orchestrator device in response to modification of the first payment process configuration by the first participant device. In such an embodiment, the one or more payment process configurations are iteratively modified based upon modification of the first payment process configuration by the first participant device.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
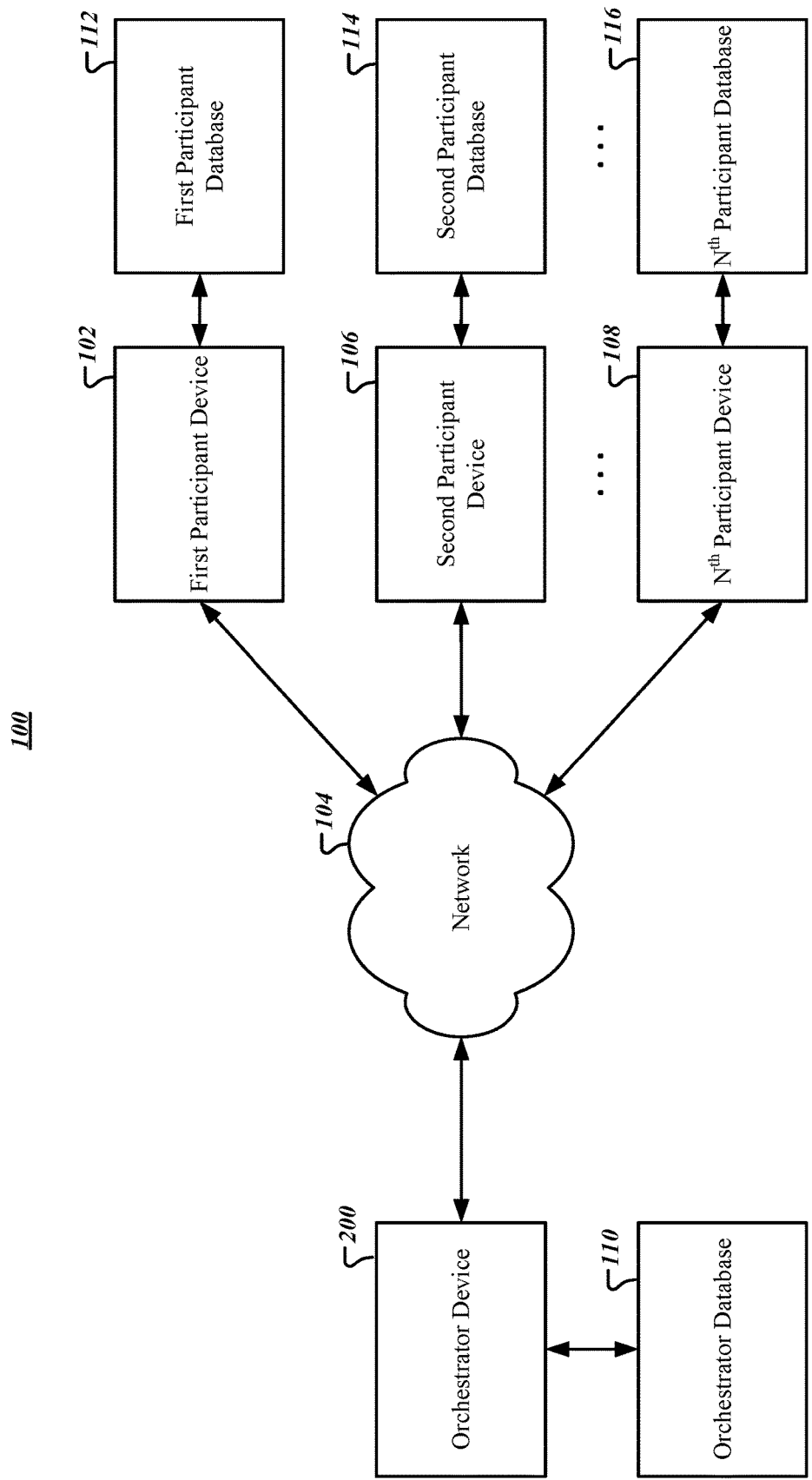
FIG. 1 illustrates a system diagram including devices that may be involved in some example embodiments described herein.

Some embodiments of the present disclosure will now be described more fully hereinafter with reference to the accompanying drawings, in which some, but not all embodiments of the disclosure are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout. As used herein, the description may refer to an orchestrator device as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the term "orchestrator device" refers to computer hardware that is configured (either physically or by the execution of software) to store payment process configurations and determine payment process configurations for participant devices and, among various other functions, is configured to directly, or indirectly, transmit and receive data. An example orchestrator device may include a smartphone, a tablet computer, a laptop computer, a central server, a remote server, a wearable device (e.g., smart glasses, smart watch, or the like), and the like. In some embodiments, an orchestrator device may include a "smart device" that is equipped with a chip or other electronic device that is configured to communicate with one or more participant devices via Bluetooth, NFC, Wi-Fi, 3G, 4G, 5G, RFID protocols, and the like. By way of a particular example, an orchestrator device may be associated with a financial institution and may locally store a plurality of payment process configurations that include configurable instructions for performing an associated portion of a payment process. The orchestrator device may be configured to communicate with an orchestrator database (e.g., housed by the orchestrator device or otherwise) via a Wi-Fi access point that is in communication with the orchestrator database.

As used herein, the term "first participant device" refers to computer hardware that is configured (either physically or by the execution of software) to access one or more services made available by the orchestrator device (e.g., apparatus of the present disclosure) and, among various other functions, is configured to directly, or indirectly, transmit and receive data. Example first participant devices may include a smartphone, a tablet computer, a laptop computer, computing device, a wearable device (e.g., smart glasses, smart watch, or the like), and the like. In some embodiments, a first participant device may include a "smart device" that is equipped with a chip or other electronic device that is configured to communicate with the orchestrator device via Bluetooth, NFC, Wi-Fi, 3G, 4G, 5G, RFID protocols, and the like. By way of a particular example, a first participant device may be a computing device or remote server equipped with a Wi-Fi radio that is configured to communicate with a Wi-Fi access point that is in communication with the orchestrator device 200 or other computing device via a network. As described hereafter, the first participant device may be configured to communicate (e.g., transmit and receive data) with a orchestrator device (e.g., housed by a central server or otherwise) via a Wi-Fi access point that is in communication with the orchestrator device so as to receive a first payment process configuration). For example, the first participant device may be associated with a (1) first task or first portion of a payment process, a (2) first business, vendor, or customer, and/or (3) a first payment process (e.g., such as instances in which the first portion of the payment process comprises the entire payment process).

The "first participant device" may, in some embodiments define, include, access, or otherwise leverage an associated "first participant database". For example, the first participant device may be associated with performance of a first portion or first task of a payment process. As such, the first participant database may be configured to locally store (e.g., stored independent of the orchestrator device) a first payment process configuration received from the orchestrator device and, in some instances, subsequently modified by the first participant device to comply with applicable requirements of the first participant device. The present disclosure contemplates that the first participant device and/or the first participant database may include any data repository, memory configuration, or structure configured to store data associated with the first payment process configuration.

As used herein, the term "second participant device" refers to computer hardware that is configured (either physically or by the execution of software) to access one or more services made available by the orchestrator device (e.g., apparatus of the present disclosure) and, among various other functions, is configured to directly, or indirectly, transmit and receive data. Example second participant devices may also include a smartphone, a tablet computer, a laptop computer, computing device, a wearable device (e.g., smart glasses, smart watch, or the like), and the like. In some embodiments, a second participant device may include a "smart device" that is equipped with a chip or other electronic device that is configured to communicate with the orchestrator device via Bluetooth, NFC, Wi-Fi, 3G, 4G, 5G, RFID protocols, and the like. By way of a particular example, a second participant device may be a computing device or remote server equipped with a Wi-Fi radio that is configured to communicate with a Wi-Fi access point that is in communication with the orchestrator device 200 or other computing device via a network. As described hereafter, the second participant device may be configured to communicate (e.g., transmit and receive data) with a orchestrator device (e.g., housed by a central server or otherwise) via a Wi-Fi access point that is in communication with the orchestrator database so as to receive a second payment process configuration). For example, the second participant device may be associated with a (1) second task or second portion of a payment process, a (2) second business, vendor, or customer, and/or (3) a second payment process (e.g., such as instances in which the second portion of the payment process comprises the entire payment process).

The "second participant device" may, in some embodiments define, include, access, or otherwise leverage an associated "second participant database". For example, the second participant device may be associated with performance of a second portion or second task of a payment process. As such, the second participant database may be configured to locally store (e.g., stored independent of the orchestrator device) a second payment process configuration received from the orchestrator device and, in some instances, subsequently modified by the second participant device to comply with applicable requirements of the second participant device. The present disclosure contemplates that the second participant device and/or the second participant database may include any data repository, memory configuration, or structure configured to store data associated with the second participant device, second payment process configuration.

As used herein, the term "$N^{th}$ participant device" refers to computer hardware that is configured (either physically or by the execution of software) to access one or more services made available by the orchestrator device (e.g., apparatus of the present disclosure) and, among various other functions, is configured to directly, or indirectly, transmit and receive data. Example $N^{th}$ participant devices may also include a smartphone, a tablet computer, a laptop computer, computing device, a wearable device (e.g., smart glasses, smart watch, or the like), and the like. In some embodiments, a $N^{th}$ participant device may include a "smart device" that is equipped with a chip or other electronic device that is configured to communicate with the orchestrator device via Bluetooth, NFC, Wi-Fi, 3G, 4G, 5G, RFID protocols, and the like. By way of a particular example, a $N^{th}$ participant device may be a computing device or remote server equipped with a Wi-Fi radio that is configured to communicate with a Wi-Fi access point that is in communication with the orchestrator device 200 or other computing device via a network. As described hereafter, the $N^{th}$ participant device may be configured to communicate (e.g., transmit and receive data) with a orchestrator device (e.g., housed by a central server or otherwise) via a Wi-Fi access point that is in communication with the orchestrator database so as to receive a $N^{th}$ payment process configuration). For example, the $N^{th}$ participant device may be associated with a (1) $N^{th}$ task or $N^{th}$ portion of a payment process, a (2) $N^{th}$ business, vendor, or customer, and/or (3) a $N^{th}$ payment process (e.g., such as instances in which the $N^{th}$ portion of the payment process comprises the entire payment process).

The "$N^{th}$ participant device" may, in some embodiments define, include, access, or otherwise leverage an associated "$N^{th}$ participant database". For example, the $N^{th}$ participant device may be associated with performance of a $N^{th}$ portion or $N^{th}$ task of a payment process. As such, the $N^{th}$ participant database may be configured to locally store (e.g., stored independent of the orchestrator device) a $N^{th}$ payment process configuration received from the orchestrator device and, in some instances, subsequently modified by the $N^{th}$ participant device to comply with applicable requirements of the $N^{th}$ participant device. The present disclosure contemplates that the $N^{th}$ participant device and/or the $N^{th}$ participant database may include any data repository, memory configuration, or structure configured to store data associated with the $N^{th}$ participant device, $N^{th}$ payment process configuration. Said differently, the present disclosure contemplates that the orchestrator device may be configured to operate or interface with any number of N participant devices with associated N participant databases (e.g., where N is a positive integer value).

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., an orchestrator device 200) communicably connected via a network 104 to a plurality of participant devices including, for example, a first participant device 102, a second participant device 106, and . . . an $N^{th}$ participant device. As defined above and described hereafter, the orchestrator device of the present disclosure may be configured for use with any number of participant devices based upon the intended application of the orchestrator device 200. The example system 100 may also include an orchestrator database 110 that may be communicably coupled with the orchestrator device 200. Such an orchestrator database 110 may operate to locally store a plurality of payment process configurations (e.g., base configurations) as described hereafter.

Therefore, the orchestrator database 110 may be stored by any suitable storage device configured to store some or all of the information described herein (e.g., a separate memory system separate from the orchestrator device 200, such as one or more database systems, backend data servers, network databases, cloud storage devices, or the like). The orchestrator database 110 may comprise data received from the orchestrator device 200 (e.g., via a memory 204 and/or processor(s) 202) such as a plurality of payment process configurations (e.g., base configurations). To avoid unnecessarily overcomplicating the disclosure, the orchestrator database 110 is shown and described as a separate database, despite the fact that they may each be hosted by any number of specific physical devices, together or separately.

The orchestrator device 200 may include circuitry, networked processors, or the like configured to perform some or all of the apparatus-based (e.g., orchestrator device-based) processes described herein, and may be any suitable network server and/or other type of processing device. In this regard, orchestrator device 200 may be embodied by any of a variety of devices. For example, the orchestrator device 200 may be configured to receive data (e.g., participant requirement parameter data or the like) and may include any of a variety of fixed terminals, such as a central server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the orchestrator device 200 may be located remotely from the first participant device 102, second participant device 106, $N^{th}$ participant device, and/or orchestrator database 110. The orchestrator device 200 may, in some embodiments, comprise several servers or computing devices performing interconnected and/or distributed functions. Despite the many arrangements contemplated herein, the orchestrator device 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first participant device 102 may be associated with a first participant configured to perform an associated first portion or first task of a payment process. In some embodiments, the first participant device 102 may, additionally or alternatively, be associated with a payment process of a first business, vendor, or customer. Although a single participant device associated with a corresponding first participant is shown, the example system 100 may include any number of participant devices that may be associated with the first participant. The first participant device 102 may be a remote server, cellular telephone (e.g., a smartphone and/or other type of mobile telephone), laptop, tablet, electronic reader, e-book device, media device, wearable, smart glasses, smartwatch, mobile device, any combination of the above, or any device by which the first participant may access the orchestrator device 200. As defined above, the first participant device 102 may be configured for use with a (1) first task or first portion of a payment process, a (2) first business, vendor, or customer, and/or (3) a first payment process (e.g., such as instances in which the first portion of the payment process comprises the entire payment process).

The first participant device 102 may, in some embodiments, define, include, access, or otherwise leverage an associated first participant database 112. For example, the first participant device 102 may be associated with performance of a first portion or first task of a payment process. As such, the first participant database 112 may be configured to locally store (e.g., stored independent of the orchestrator device 200) a first payment process configuration received from the orchestrator device 200 and, in some instances, subsequently modified by the first participant device 102 to comply with applicable requirements of the first participant device 102. The present disclosure contemplates that the first participant device 102 and/or the first participant database 112 may include any data repository, memory configuration, or structure configured to store data associated with the first payment process configuration used by the first participant device 102.

The second participant device 106 may be associated with a second participant configured to perform an associated second portion or second task of a payment process. In some embodiments, the second participant device 106 may, additionally or alternatively, be associated with a payment process with a second business, vendor, or customer. Although a single participant device associated with a corresponding second participant is shown, the example system 100 may include any number of participant devices that may be associated with the second participant. The second participant device 106 may be a remote server, cellular telephone (e.g., a smartphone and/or other type of mobile telephone), laptop, tablet, electronic reader, e-book device, media device, wearable, smart glasses, smartwatch, mobile device, any combination of the above, or any device by which the second participant may access the orchestrator device 200. As defined above, the second participant device 106 may be configured for use with a (1) second task or second portion of a payment process, a (2) second business, vendor, or customer, and/or (3) a second payment process (e.g., such as instances in which the second portion of the payment process comprises the entire payment process).

The second participant device 106 may, in some embodiments define, include, access, or otherwise leverage an associated second participant database 114. For example, the second participant device 106 may be associated with performance of a second portion or a second task of a payment process. As such, the second participant database 114 may be configured to locally store (e.g., stored independent of the orchestrator device 200) a second payment process configuration received from the orchestrator device 200 and, in some instances, subsequently modified by the second participant device 106 to comply with applicable requirements of the second participant device 106. The present disclosure contemplates that the second participant device 106 and/or the second participant database 114 may include any data repository, memory configuration, or structure configured to store data associated with the second payment process configuration used by the second participant device 106.

The $N^{th}$ participant device 108 may be associated with a $N^{th}$ participant configured to perform an associated $N^{th}$ portion or $N^{th}$ task a payment process. In some embodiments, the $N^{th}$ participant device 108 may, additionally or alternatively, be associated with a payment process with a $N^{th}$ business, vendor, or customer. Although a single participant device associated with a corresponding $N^{th}$ participant is shown, the example system 100 may include any number of participant devices that may be associated with the $N^{th}$ participant (e.g., N number of participant devices). The $N^{th}$ participant device 108 may be a remote server, cellular telephone (e.g., a smartphone and/or other type of mobile telephone), laptop, tablet, electronic reader, e-book device, media device, wearable, smart glasses, smartwatch, mobile device, any combination of the above, or any device by which the $N^{th}$ participant may access the orchestrator device 200. As defined above, the $N^{th}$ participant device 108 may be configured for use with a (1) $N^{th}$ task or $N^{th}$ portion of a payment process, a (2) $N^{th}$ business, vendor, or customer, and/or (3) a $N^{th}$ payment process (e.g., such as instances in which the $N^{th}$ portion of the payment process comprises the entire payment process).

The $N^{th}$ participant device 108 may, in some embodiments define, include, access, or otherwise leverage an associated $N^{th}$ participant database 116 (e.g., N number of participant databases). For example, the $N^{th}$ participant device 108 may be associated with performance of a $N^{th}$ portion or $N^{th}$ task of a payment process. As such, the $N^{th}$ participant database 116 may be configured to locally store (e.g., stored independent of the orchestrator device 200) a $N^{th}$ payment process configuration received from the orchestrator device 200 and, in some instances, subsequently modified by the N$^{th}$ participant device 108 to comply with applicable requirements of the N$^{th}$ participant device 108. The present disclosure contemplates that the N$^{th}$ participant device 108 and/or the N$^{th}$ participant database 116 may include any data repository, memory configuration, or structure configured to store data associated with the N$^{th}$ payment process configuration used by the N$^{th}$ participant device 108. Said differently, the present disclosure contemplates that the orchestrator device 200 may be operably connected via the network 104 to any number of participant devices, each of which may be communicably coupled with a respective participant database.

Figure 2:
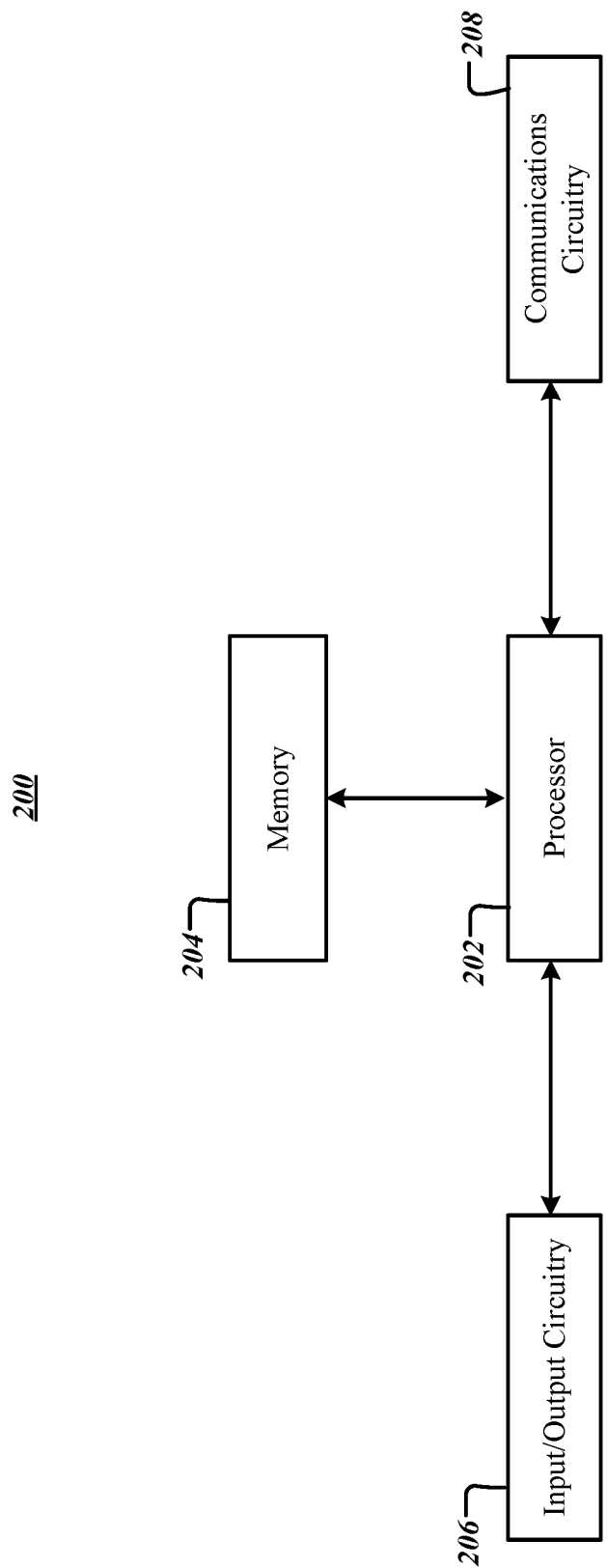
FIG. 2 illustrates a schematic block diagram of example circuitry that may perform various operations, in accordance with some example embodiments described herein.

As illustrated in FIG. 2, the orchestrator device 200 may include a processor 202, a memory 204, input/output circuitry 206, and communications circuitry 208. The orchestrator device 200 may be configured to execute the operations described below in connection with FIGS. 3-4. Although components 202-208 are described in some cases using functional language, it should be understood that the particular implementations necessarily include the use of particular hardware. It should also be understood that certain of these components 202-208 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the orchestrator device 200 may be housed within one or more of the first participant device 102, the second participant device 106, and/or the N$^{th}$ participant device 108. As indicated previously, it will be understood in this regard that some of the components described in connection with the orchestrator device 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the orchestrator device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the orchestrator device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the orchestrator device 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the orchestrator device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The orchestrator device 200 further includes input/output circuitry 206 that may, in turn, be in communication with processor 202 to provide output to a user and to receive input from a user, participant device, or another source (e.g., so as receive user attribute data or sensor data). In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 may be configured to control one or more functions of a display through computer program instructions (e.g., software and/or firmware) stored on a memory accessible to the processor (e.g., memory 204, and/or the like), so as receive user attribute data and/or sensor data.

The communications circuitry 208 may be any means such as a device or circuitry embodied in either hardware or a combination of hardware and software that is configured to receive and/or transmit data from/to a network and/or any other device, circuitry, or module in communication with the orchestrator device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the orchestrator device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In addition, computer program instructions and/or other type of code may be loaded onto a computer, processor or other programmable orchestrator device's circuitry to produce a machine, such that the computer, processor other programmable circuitry that execute the code on the machine create the means for implementing the various functions, including those described in connection with the components of orchestrator device 200.

As described above and as will be appreciated based on this disclosure, embodiments of the present disclosure may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Event-Based Payment Orchestration

Figure 3:
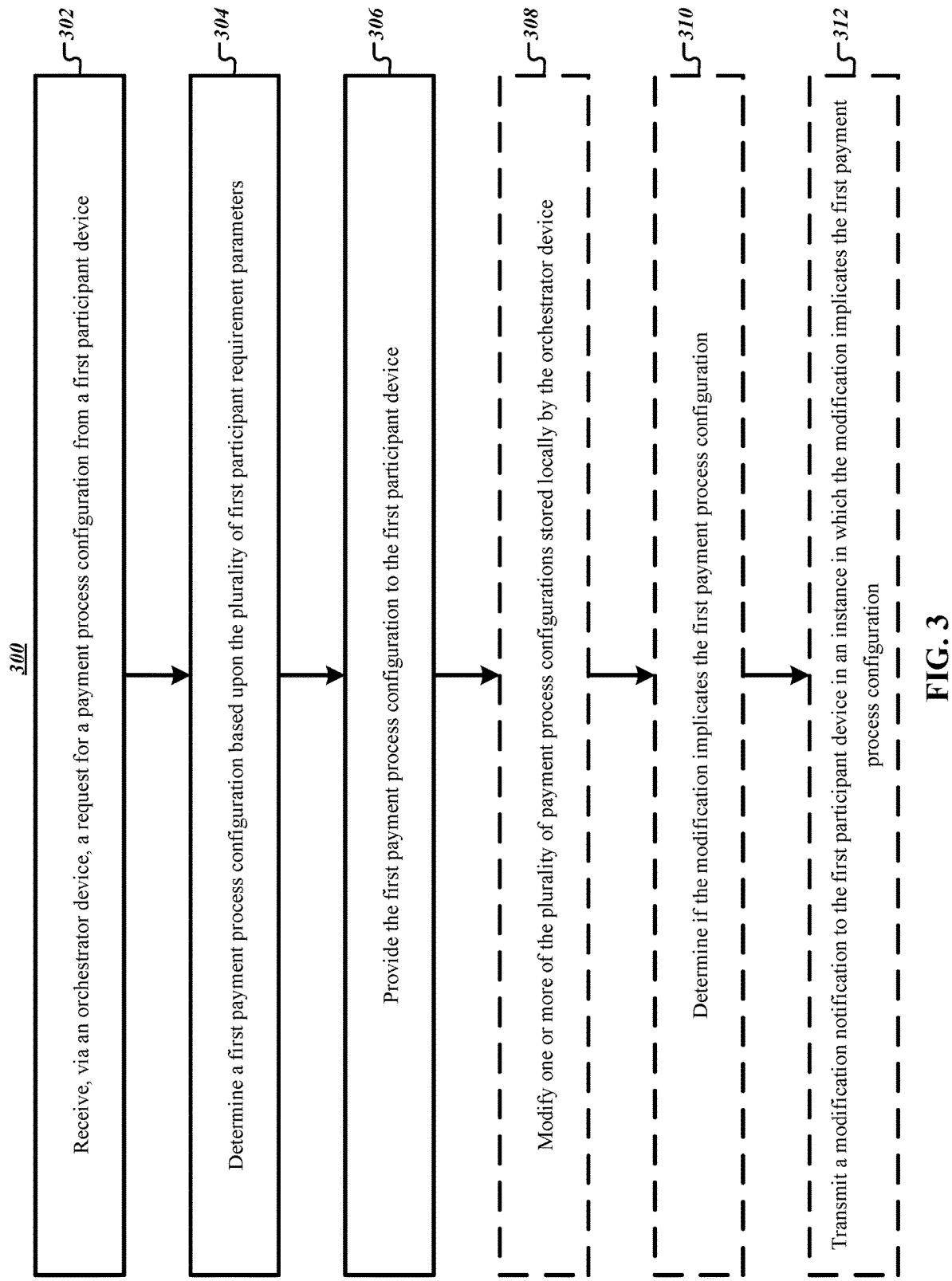
FIG. 3 illustrates an example flowchart for event-based payment orchestration, in accordance with some example embodiments described herein.

FIG. 3 illustrates a flowchart containing a series of operations for event-based payment orchestration. The operations illustrated in FIG. 3 may, for example, be performed by, with the assistance of, and/or under the control of an apparatus (e.g., orchestrator device 200), as described above. In this regard, performance of the operations may invoke one or more of processor 202, memory 204, input/output circuitry 206, and/or communications circuitry 208.

As shown in operation 302, the apparatus (e.g., orchestrator device 200) includes means, such as input/output circuitry 206, communications circuitry 208, or the like, for receiving a request for a payment process configuration from a first participant device. As described above, the orchestrator device 200 may, in some embodiments, be a central server that is communicably coupled with the first participant device 102 over the network. The orchestrator device 200 may operate to store a plurality of payment process configurations locally, such as via the orchestrator database 110. Each of the plurality of payment process configurations may include configurable (e.g., modifiable) instructions for performing at least a portion of a payment process. By way of example, the plurality of payment process configurations may include instructions for completing verification/authentication tasks, payment routing tasks, account identification tasks, or any such task for completing a payment process.

The plurality of payment process configurations may be supplied to the orchestrator device 200 for local storage (e.g., storage separate from various participant devices) as part of an initial set up procedure, by a user or administrator associated with the orchestrator device 200, or the like. For example, the orchestrator device 200 may be associated with or serve as a central server of a financial institution in which the orchestrator device 200 operates to, in whole or in part, control, facilitate, or otherwise support implementation of processes of the financial institution (e.g., an example payment process). In order to provide variability to the distinct participant devices that interface with the orchestrator device 200 and their associated customers, vendors, businesses, etc. the plurality of process configurations stored locally by the orchestrator device 200 may comprise configurable instructions for performing a base or standardized portion of a payment processes. By way of example, each participant device that interfaces with the orchestrator device 200 that performs an example payment verification process may include various constraints, requirements, etc. associated with performance of this payment verification process (e.g., at least a portion thereof) such that the payment verification process implemented by a particular participant device may different from the payment verification process implemented by another participant device.

As opposed to conventional systems where these differing implementations would be commonly stored by a centralized system thereby burdening the capabilities of the centralized system, the orchestrator device 200 of the present disclosure is configured to store and manage a plurality of payment process configurations that are configurable by particular participant devices in order to satisfy the requirements associated with the operations performed by these particular participant devices. Although described with reference to an example payment process performed by participant devices, the present disclosure contemplates that the payment process configurations described herein may refer to not only payment related process configurations but process configurations, workflows, operations, etc. of any industry, service, or application.

With continued reference to operation to 302, the request for a payment process configuration by the orchestrator device 200 from the first participant device 102 may include a plurality of first participant requirement parameters. By way of continued example, the first participant device 102 may be associated with or configured to perform a portion of a payment process, such as payment verification tasks, payment routing tasks, account identification tasks, or any operation associated with a payment. The first participant device 102, however, may be associated with a first vendor, first customer, first business, etc. such that the first participant device's performance of the associated portion of the payment process is subject to first participant requirement parameters. For example, the first participant device 102 may interface with a first customer that includes various requirements associated with performance of the portion of the payment process for this first customer. As such, the request for a payment process received by the orchestrator device at operation 302 from the first participant device 102 may include these first participant requirement parameters.

Thereafter, in operation 304, the apparatus (e.g., orchestrator device 200) may further include means, such as the processor 202, communications circuitry 208, or the like for determining a first payment process configuration based upon the plurality of participant requirement parameters. As described above, the orchestrator device 200 may include a plurality of payment process configurations each of which may be configurable and associated with a particular portion of a payment process. By way of continued example, a payment process configuration for performing payment verification tasks, a payment process configuration for performing payment routing tasks, a payment process configuration for performing account identification tasks, and/or the like may be stored locally by the orchestrator device 200. The orchestrator device 200 at operation 304 may analyze the plurality of participant requirement parameters received from the first participant device 102 and select the first payment process configuration that satisfies or is most similar to the payment requirement parameters. For example, the plurality of participant requirement parameters may be indicative of requirements associated with a payment verification process such that the orchestrator device 200 may compare these requirements with the associated requirements of a first payment process configuration that similarly includes data indicative of the example payment verification process. Although described herein with reference to an example comparison, the present disclosure contemplates that the orchestrator device may employ various thresholds, machine learning techniques, natural language processing, and/or the like to perform the determination at operation 304 based upon the intended application of the orchestrator device 200.

Thereafter, as shown in operation 306, the apparatus (e.g., orchestrator device 200) includes means, such as processor 202 or the like, for providing the first payment process configuration to the first participant device 102. Following determination of the first payment process configuration based upon the plurality of participant requirement parameters (i.e., determining the payment process configuration that satisfies the first participant requirement parameters), the orchestrator device 200 may, for example, transmit the first payment process configuration to the first participant device 102. The first participant device 102 may operate to modify, augment, or otherwise adapt the first payment process configuration for the particular operations performed by the first participant device 102. As described herein, the first participant device 102 may be configured to interface with a particular customer, business, or vendor that includes requirements for performing the payment process or portion of the payment process performed by the first participant device 102. These modifications, however, may be stored locally by the first participant database 112 as opposed to by the orchestrator device 200.

In this way, the embodiments of the present disclosure may operate to reduce the memory and, by association, processing burdens of the orchestrator device 200 (e.g., a central sever) by selectively storing payment process configuration data that is modified for specific customers, vendors, businesses, etc. locally on the first participant device 102 that performs the function associated with the first payment process. In doing so, the embodiments described herein provide a lightweight and agile orchestrator device 200 that provides efficient modification of payment process configurations without impact to particular participant configurations and further facilitates identification of error occurrences.

In some embodiments, as shown in operation 308, the apparatus (e.g., orchestrator device 200) includes means, such as processor 202 or the like, for modifying one or more of the plurality of payment process configurations stored locally by the orchestrator device 200. As would be evident in light of the operation of the orchestrator device 200, changes in the base or standardized payment process configurations stored locally by the orchestrator device 200 may occur, such as in response to administrative system changes, applicable governmental regulations, system capabilities, etc. As such, at operation 308, the orchestrator device 200 may modify one or more of the plurality of payment process configurations by, for example, transmitting instructions to the orchestrator database 110 to modify one or more of the plurality of payment process configurations. Although described herein with reference to example system changes, the present disclosure contemplates that one or more of the plurality of payment process configurations may be modified at operation 308 for any reason without limitation.

In some embodiments, as shown in operation 310, the apparatus (e.g., orchestrator device 200) includes means, such as processor 202 or the like, for determining if the modification implicates the first payment process configuration. By way of example, the orchestrator device 200 may, in some embodiments, determine that a payment process configuration that is modified at operation 308 is the first payment process configuration provided to the first participant device 102 at operation 306, or is otherwise associated with or implicated by the first payment process configuration. In some instances, the orchestrator device 200 may maintain a record, such as in the orchestrator database 110, of the payment process configurations provided to participant devices against which the modification at operation 308 may be compared. In other embodiments, the orchestrator device 200 may indicate to (e.g., via a transmission or otherwise) a plurality of participant devices that a modification has occurred and rely upon the distinct operations of the participant devices to determine if the modification implicates a respective payment process configuration employed by the particular participant device.

In some embodiments, as shown in operation 312, the apparatus (e.g., orchestrator device 200) includes means, such as processor 202, communications circuitry 208, or the like, for transmitting a modification notification to the first participant device in an instance in which the modification implicates the first payment process configuration. Given that the orchestrator device 200 only locally stores the plurality of payment process configurations as opposed to the particular implementations of these configurations at the participant device level, if a modification implicates the first payment process configuration of the first participant device 102, the orchestrator device 200 may notify the first participant device 102 of any modification so that the first participant device 102 may, if necessary, modify the first payment process configuration at the first participant device level. For example, the first participant device 102 may similarly modify the first payment process configuration, and any of its associated augmentations as described above, by modifying the first participant database 112.

Figure 4:
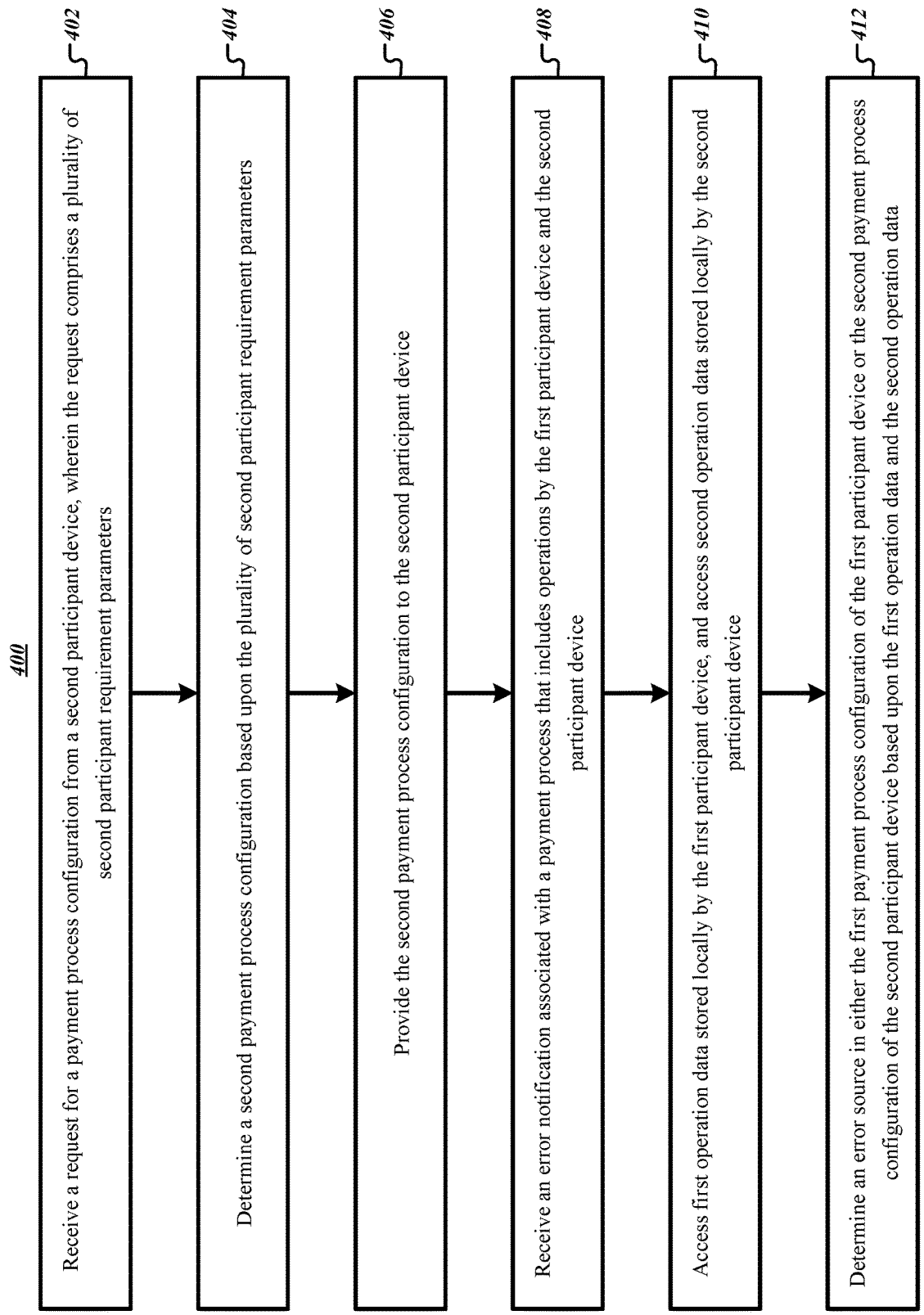
FIG. 4 illustrates an example flowchart for error source identification, in accordance with some example embodiments described herein.

Turning next to FIG. 4, a flowchart is shown for error source determinations. The operations illustrated in FIG. 4 may, for example, be performed by, with the assistance of, and/or under the control of an apparatus (e.g., orchestrator device 200), as described above. In this regard, performance of the operations may invoke one or more of processor 202, memory 204, input/output circuitry 206, and/or communications circuitry 208.

As shown in operation 402, the apparatus (e.g., orchestrator device 200) includes means, such as input/output circuitry 206, communications circuitry 208, processor 202, or the like, for receiving a request for a payment process configuration from a second participant device 106, wherein the request comprises a plurality of second participant requirement parameters. Similar to the operations of FIG. 3, a second participant device 106 may be associated with or configured to perform a portion of a payment process, such as payment verification tasks, payment routing tasks, account identification tasks, or any operation associated with a payment process. The second participant device 106, however, may be associated with a second vendor, second customer, second business, etc. such that the second participant device's performance of the associated portion of the payment process is subject to second first participant requirement parameters. For example, the second participant device 106 may interface with a second customer that includes various requirements associated with performance of the portion of the payment process for this second customer. As such, the request for a payment process received by the orchestrator device at operation 402 from the second participant device 106 may include these second participant requirement parameters.

Thereafter, as shown in operation 404, the apparatus (e.g., orchestrator device 200) or the like, for determining a second payment process configuration based upon the plurality of second participant requirement parameters. As described above, the orchestrator device 200 may include a plurality of payment process configurations each of which may be configurable and associated with a particular portion of a payment process. By way of continued example, a payment process configuration for performing payment verification tasks, a payment process configuration for performing payment routing tasks, a payment process configuration for performing account identification tasks, and/or the like may be stored locally by the orchestrator device 200. The orchestrator device 200 at operation 404 may analyze the plurality of second participant requirement parameters received from the second participant device 106 and select the second payment process configuration that satisfies or is most similar to the second payment requirement parameters. For example, the plurality of second participant requirement parameters may be indicative of requirements associated with a payment routing process such that the orchestrator device 200 may compare these requirements with the associated requirements of a second payment process configuration that similarly includes data indicative of the example payment routing process. Although described herein with reference to an example comparison, the present disclosure contemplates that the orchestrator device 200 may employ various thresholds, machine learning techniques, natural language processing, and/or the like to perform the determination at operation 404 based upon the intended application of the orchestrator device 200.

Thereafter, as shown in operation 406, the apparatus (e.g., orchestrator device 200) includes means, such as input/output circuitry 206, communications circuitry 208, processor 202, or the like, for providing the second payment process configuration to the second participant device. Following determination of the second payment process configuration based upon the plurality of second participant requirement parameters (i.e., determining the payment process configuration that satisfies the second participant requirement parameters), the orchestrator device 200 may, for example, transmit the second payment process configuration to the second participant device 106. The second participant device 106 may operate to modify, augment, or otherwise adapt the second payment process configuration for the particular operations performed by the second participant device 106. As described herein, the second participant device 106 may be configured to interface with a particular customer, business, or vendor that includes requirements for performing the payment process or portion of the payment process performed by the second participant device 106. These modifications, however, may be stored locally by the second participant database 114 as opposed to by the orchestrator device 200.

In some embodiments, the first payment process configuration and the second payment process configuration may be associated with the same overall payment process (e.g., each represent a portion of the payment process). As such, inputs/outputs of the first participant device 102 may impact the inputs/outputs of the second participant device 106, and vice versa. As such, an error in one or more of these participant devices may result in further errors by other participant devices. As such, as shown in operation 408, the apparatus (e.g., orchestrator device 200) includes means, such as input/output circuitry 206, communications circuitry 208, processor 202, or the like, for receiving an error notification associated with a payment process that includes operations by the first participant device 102 and/or the second participant device 106. This error notification may be received from another participant device from amongst the N participant devices illustrated in FIG. 1, a customer, vendor, or business that interfaces with a respective participant device of the present disclosure, and/or any other source.

Thereafter, as shown in operation 410, the apparatus (e.g., orchestrator device 200) includes means, such as input/output circuitry 206, communications circuitry 208, processor 202, or the like, for accessing first operation data stored locally by the first participant device 102, and access second operation data stored locally by the second participant device 106. As described above, the embodiments of the present disclosure may operate to reduce the memory and, by association, processing burdens of the orchestrator device 200 by selectively storing payment process configuration data that is modified for specific customers, vendors, businesses, etc. locally on the participant device that performs the function associated with the particular payment process. As such, operation data associated with particular implementations of the payment process configurations at the participant device level are stored by respective participant devices (e.g., the first participant device 102 via the first participant database 112, the second participant device 106 via the second participant database 114, etc.). As such, the orchestrator device 200 may query the respective participant devices 102, 106 and/or their respective databases 112, 114 in order to retrieve operational data that may potentially be indicative of an error in the overall payment process.

Thereafter, as shown in operation 410, the apparatus (e.g., orchestrator device 200) or the like, for determining an error source in either the first payment process configuration of the first participant device 102 or the second payment process configuration of the second participant device 106 based upon the first operation data and the second operation data. The orchestrator device 200, in its capacity as storing the plurality of payment process configurations alone may rely upon any number of error analysis techniques, comparisons, thresholds, or the like. In some embodiments, the determination of the error source may occur at the participant device level in that data indicative of a potential error is stored by the first participant database 112 and/or the second participant database 114 and transmitted to the orchestrator device 200. In this way, the orchestrator device 200 may continue to operate as a lightweight and agile central server by avoiding the memory and processing burden associated with localized storage of operation data, error data, etc.

Although described herein with reference to the first participant device 102 and the second participant device 106, the present disclosure contemplates that the orchestrator device 200 may interface with any number of participant devices as shown in FIG. 1 (e.g., N participant devices 108 and associated databases 116). Furthermore, in some embodiments, one or more of the plurality of payment process configurations stored locally by the orchestrator device may be modified in response to modification of the first payment process configuration by the first participant device 102, modification of the second payment process configuration by the second payment device 106, etc. Said differently, in some embodiments the modifications by a participant device to a particular payment process configuration may result in an improvement to the payment process configuration that may, for example, benefit or otherwise improve the operations of other participant devices, other payment process configurations, and/or the like. In such an embodiment, the orchestrator device 200 may modify one or more of the plurality of payment process configurations stored locally by the orchestrator device 200 based upon this determined improvement. In some further embodiments, the one or more payment process configurations may be iteratively modified based upon modification of a particular payment process configuration by an associated participant device. Said differently, the orchestrator device 200 may employ one or more machine learning techniques, feedback loops, etc. to iteratively improve the performance of the orchestrator device 200, the payment process configurations, and/or the like.

As described above, various technical challenges are surmounted via technical solutions contemplated herein. For example, embodiments of the present disclosure may operate to address several technical challenges that result in improvements to the fundamental operation of computing systems of an example financial institution. As described above and hereafter, the embodiments of the present disclosure may operate to reduce the memory and, by association, processing burdens of a centralized device (e.g., an orchestrator device) by selectively storing payment process configuration data that is modified for specific customers, vendors, businesses, etc. locally on the participant device that performs the function associated with the particular payment process. In doing so, the embodiments described herein provide a lightweight and agile orchestrator device that provides efficient modification of payment process configurations without impact to particular participant configurations and further facilitates identification of error occurrences.

FIGS. 3-4 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the orchestrator device 200 and executed by a processor 202 of the orchestrator device 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Example System Frameworks and Architectures

Figure 5:
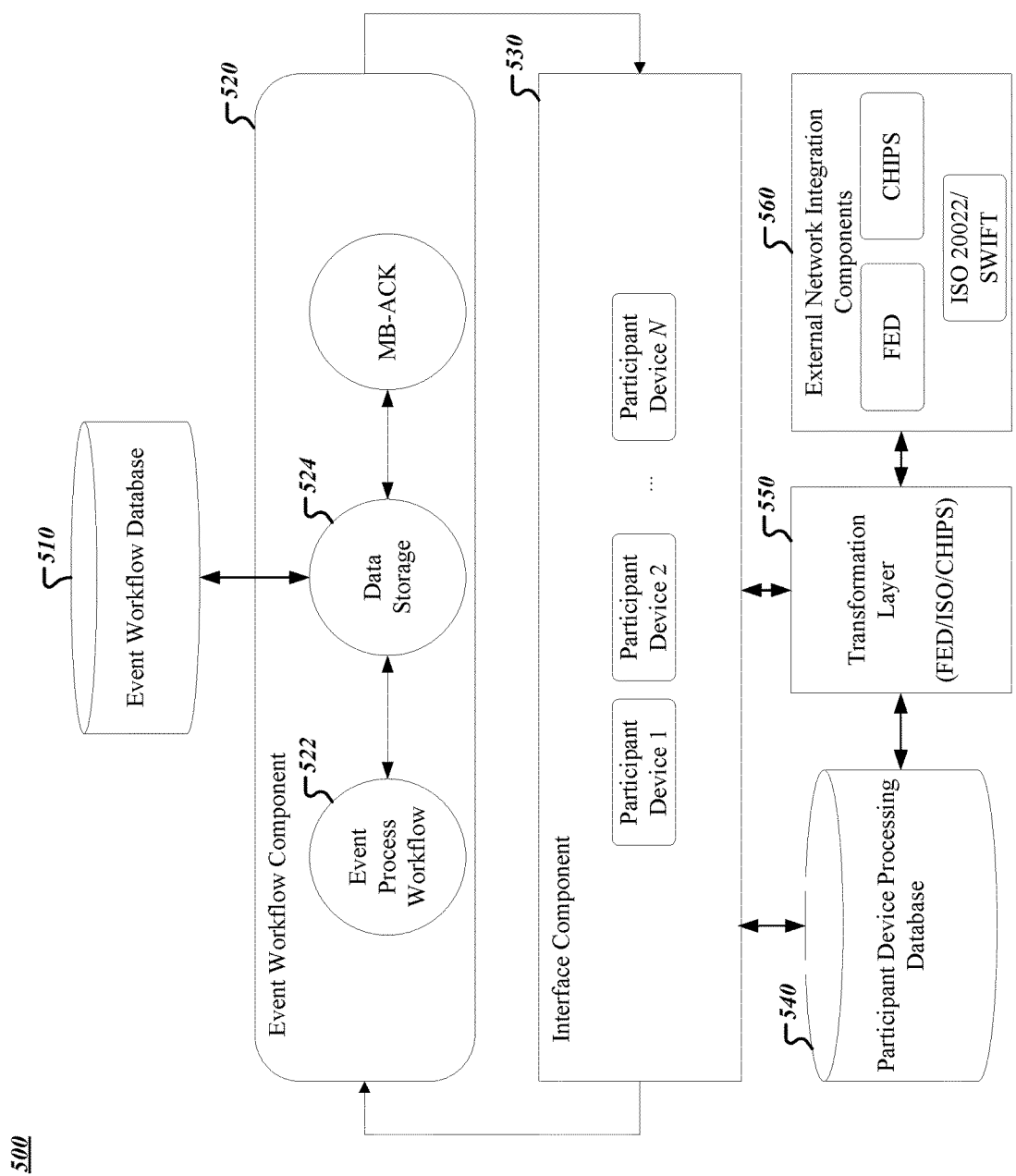
FIG. 5 provides an operational example of an example payment orchestration system architecture in accordance with at least one example embodiment of the present invention.

FIG. 5 illustrates an operational example of a payment orchestration system architecture 500, which may be implemented for the processes and/or operations as described above. As shown in FIG. 5, the payment orchestration system architecture 500 may include an event workflow database 510, an event management workflow management component 520, and interface component 530, a participant device processing database 540, a transformation layer 550, and an external network integration component 560. In some embodiments, the event workflow database 510 may be the orchestrator database 110, which is configured as described above.

The event workflow management component 520 may include an event process workflow 522 and a data storage 524. The event process workflow 522 may refer to one or more of the operations as described above with respect to FIGS. 3-4 as executed by an orchestrator device 200. The data storage 524 may be a local storage, such as on the orchestrator device 200, that may provide the orchestrator device 200 with required data, such as the plurality of payment process configurations, necessary for the operations within the event process workflow. Similarly, the data storage 524 may store output from the event process workflow as output by the orchestrator device 200. The data storage 524 may be communicatively connected to the event workflow database 510, which in some embodiments may be hosted remotely from orchestrator device 200, such that at least a portion of the data stored is shared or accessible to either storage. Information and/or data may be exchanged between the event workflow database 510 and/or data storage 524 such that the event workflow database 510 may store updated and accurate data regarding outputs from an orchestrator device 200 in response to an event process workflow and similarly, data storage 524 may store up to date information, such as updated payment process configurations and provide them to orchestrator device 200.

The interface component 530 may include one or more participant devices, such as first participant device 102, second participant device 106, through the N$^{th}$ participant device 108. A respective participant device may participate in the operations of the event process workflow 522 as described above with respect to FIG. 3-4. Participant devices may receive communications from and provide communications to the orchestrator device 200 as required during event process workflow operations.

The transformation layer 550 may control how information is exchanged between a respective participant device and the orchestrator device, such as during operations related to the event process workflows which require an exchange of information between these devices. In particular, the transformation layer 550 may use external network integration components 560, which includes various adapters, enterprise services, and publish channels to send and receive data via external systems and applications. In particular, the external network integration components 560 may include Fedwire (FED), clearing house interbank payment system (CHIPS), society for worldwide interbank financial telecommunications (SWIFT), and/or international organization for standardization (ISO) 20022 to exchange messages between devices. These various components may control how data is structured and communicated between devices as well as how funds are moved between parties and ultimately settled.

A participant device processing database 540 may be communicatively connected to the transformation layer 550 and/or interface component 530. The participant device processing database 540 may store various information related to the participant devices, such as operation data associated with particular implementations of the payment process configurations for a respective participant device. In some embodiments, the participant device processing database 540 may be configured to provide stored information to a respective participant device for storage in an associated memory, such as first participant database 112 for first participant device 102, second participant database 114 for second participant device 106, through $N^{th}$ participant database 116 for the $N^{th}$ participant device 108. Alternatively, the participant device database 540 may be configured to receive and store information from participant devices and/or transformation layer 550.

Figure 6:
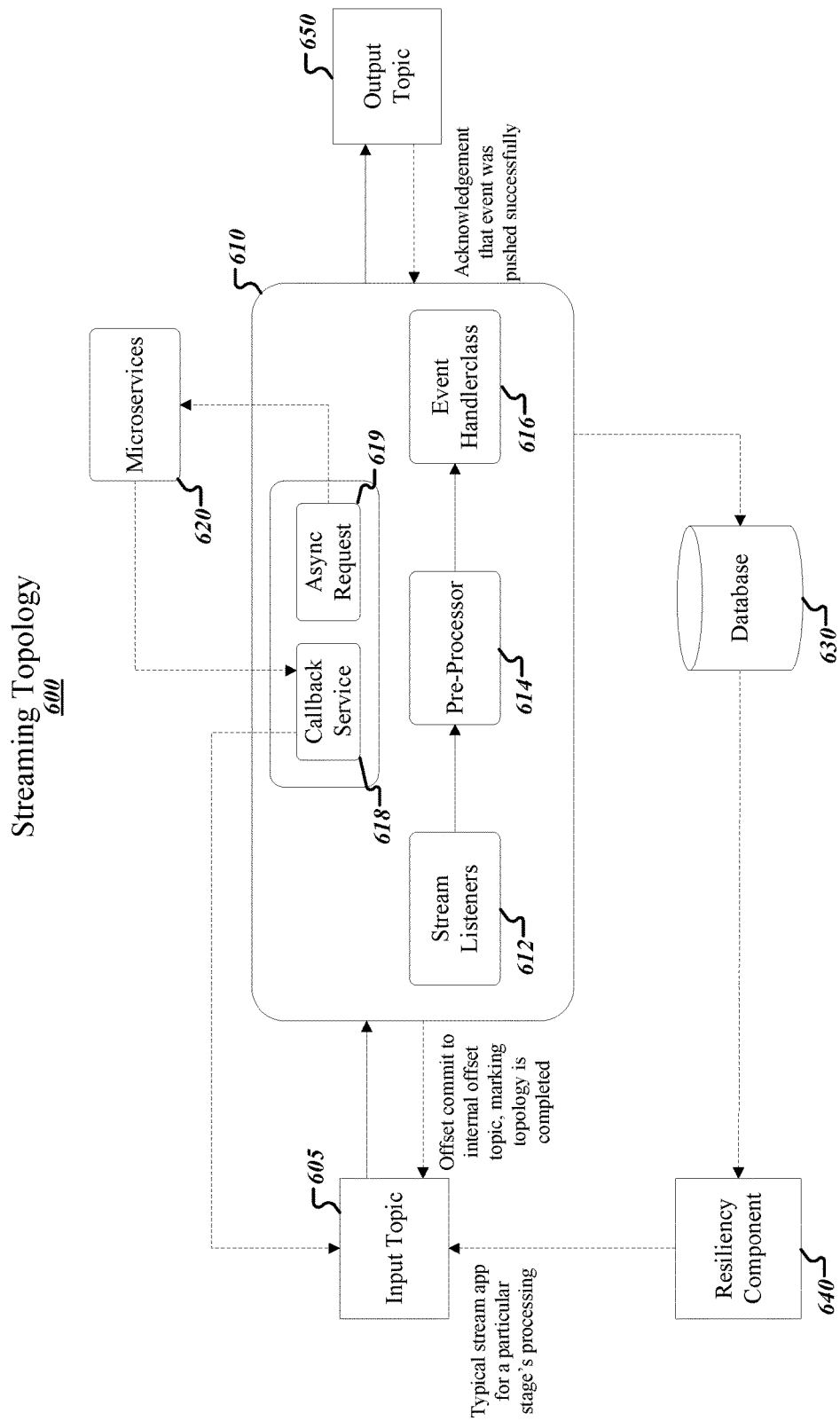
FIG. 6 provides an operational example of an example streaming topology in accordance with at least one example embodiment of the present invention.

FIG. 6 illustrates an example streaming topology, which may be implemented for the processes and/or operations as described above. A streaming topology may refer to the workflow associated with the execution of a stream application on a client, such as a participant device. Advantageously, steam applications only store and utilize components as required by given operations and/or tasks as opposed to convention application, which require the entirety of the application to be installed and downloaded prior to use. This agile architecture allows for the production and utilization of more robust and comprehensive library of operations for a given application as there is no requirement for a client to download the entirety of the application components.

As shown in FIG. 6, an input topic 605 may be accessible to one or more participant devices and may be pushed to a remote storage by a producer. In some embodiments, a producer is orchestrator device 200 and/or a remote storage is an orchestrator database 110. Alternatively, the remote storage is a different storage device than orchestrator database 110 that is associated with the orchestrator device 200. An input topic may be for example, a particular payment process configuration. A producer may generate a message, which is pushed to input topic 605, such as in response to a request for a payment process configuration from a participant device. An input topic 605 may be an Apache Kafka topic. In some embodiments, the remote storage (e.g., orchestrator database 110) is a local storage or is a cloud storage. In particular, the remote storage may be hosted on the Oracle Event Hub Cloud. An input topic may be a category of topic which can be used to organize messages. An input topic may be for example, a particular payment process configuration.

A client 610, which may be a participant device, may use stream listeners 612 to receive the data from the input topic 605. For example, the client 610 (e.g., participant device) may receive the data from the input topic 605 in response to providing a request for a payment process configuration to the orchestrator device 200. Once the data is received, the client 610 may use the pre-processor 614 and an event handlerclass 616 to modify the data according to client data. For example, a participant device may modify, augment, or otherwise adapt a payment process configuration according to the particular operations performed by the participant device, as described above in FIGS. 3-4. In some embodiments, the client 610 may provide a notification to the remote storage that the input topic was received successfully upon receipt of the input topic data.

In some embodiments, the client 610 may use a callback service 618 and/or an asynchronous request 619 to retrieve data from the input topic 605. An asynchronous request 619 may initiate the request for data from an input topic 605 asynchronously such that client 610 does not wait for an immediate response but uses the one or more microservices 620 to register a callback using callback service 618. Callback service 618 may then send the request for data from the input topic 605, which may be later than when the async request 619 was received.

The client 610 may provide the modified data as an output topic 650 by pushing it to the remote storage (e.g., orchestrator database 110). The output topic 650 may be stored by the remote storage for a limited period of time or an unlimited period of time. The data from the output topic 650 may be queried, retrieved, other otherwise accessible to an associated orchestrator device, such that the orchestrator device may store the output topic 650 data in an associated memory, if desirable. In some embodiments, the client 610 may receive notification that the output topic push was successful upon receipt of the output topic by the remote storage.

The client 610 may also store this data in a database 630, which may be an associated participant device database. The database 630 may exchange data with a resiliency component 640, which may also be exchange information with the remote storage storing the input topic 605. As such, this architecture provides a resiliency measure for the modified payment process configuration data associated with the input topic in the event data associated with input topic and/or output topic is corrupted or otherwise inaccessible.

As shown in FIG. 6, the streaming topology 600 allows for lightweight, configurable metadata driven flows which use a standardized response template (e.g., input topic 605) accessible to all participant devices. This lightweight and agile structure is therefore easily horizontally scalable and can allow for any number of client devices (e.g., participant devices) to perform event-based payment orchestration operations without undue burden on an associated orchestrator device and/or orchestrator device memory. Similarly, the use of a stream application allows for streamlined and efficient usage of computational resources associated with participant devices. Additionally, provision of data using an input topic and storage of data using an output topic format allows for build-in support for idempotency and conversely, the flexibility to change existing workflows by simply updating an input topic. Furthermore, the streaming topology 600 also allows for resiliency against topic failures by duplicating input topic data (e.g., payment process configuration data) and/or output topic data (e.g., modified payment process configuration data), such as in database 630 and resiliency component 640. This also allows for the traceability and/or audit of events at the client (e.g., participant device) level by simply viewing associated output topic data from the client.

Example System Frameworks and Architectures for Payment Initiation

Figure 7:
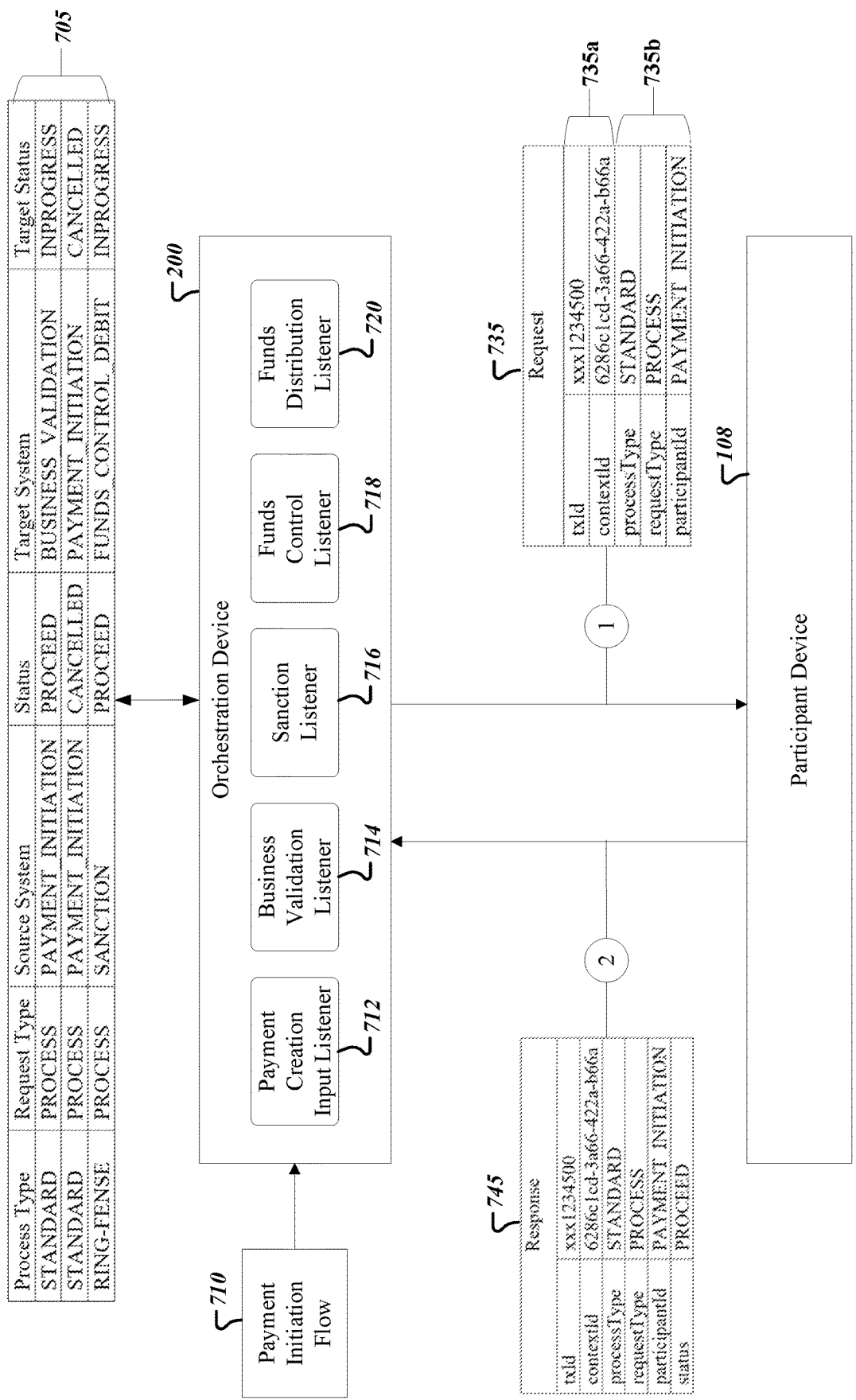
FIG. 7 provides an operational example of a payment initiation workflow in accordance with at least one example embodiment of the present invention.

FIG. 7 illustrates an example workflow between an orchestrator device 200 and one or more participant devices, such as participant device 108, which may be implemented for executing a payment process, such as in response to a generation of a modified payment process configuration by a participant device. An orchestrator device 200 may receive a payment initiation flow request 710 from an origination service associated with the orchestrator device. An origination service may relate to a particular entity associated with a transaction which uses a modified payment process configuration from a participant device. The payment initiation flow request may be a modified payment process configuration associated with one or more participant devices. Upon receipt of the payment initiation flow, the orchestrator device 200 may update a payment information list 705 to include a request entry relating to the payment initiation flow. The request entry may include at least a portion of the information from the payment initiation flow as well as a payment initiation status, which may be blank until a payment initiation response is received from a participant device 108.

The orchestrator device 200 may include one or more listeners, such as a payment creation input listener 712, a business validation listener 714, a sanction listener 716, a funds control listener 718, and a funds distribution listener 720. Each listener may be configured to perform various operations in response to a particular event, such as a message. For example, the payment creation input listener 712 may be configured to generate a payment creation request in response to receipt of a payment initiation flow 710. The business validation listener 714 may be configured to update one or more payment process configurations in response to detected changes within associated rules or regulations for the business associated with the orchestrator device 200. Similarly, the sanction listener 716 may be configured to update one or more payment process configurations in response to detected changes within sanctions for certain items, goods, entities, etc. associated with the orchestrator device 200. A funds control listener 718 may be configured to control the setup for the transfer of funds between associated parties in response to an event, such as a "Proceed" payment initiation status received from a participant device. For example, the funds control listener may determine the associated parties, party accounts, transfer amount, method of transfer, etc. for the payment A funds distribution listener 720 may be configured to distribute the funds between the parties in response to an event, such as a "Proceed" payment initiation status received from a participant device.

Upon receipt of the payment initiation flow 710, the orchestrator device 200 may provide a payment initiation request 735 to a participant device associated with the payment initiation flow 710. The payment initiation request 735 may include a context identifier 735*a* uniquely identifying the payment initiation flow and payment initiation request as well as a message 735*b* which may include details relating to the payment initiation flow.

The participant device 108 may receive the payment initiation request 735 from the orchestrator device 200 and may process the payment initiation request 735 to validate the request, determine if the request is a duplicate request, and/or handle retry events. The participant device may be configured to employ various validation schema to validate the payment initiation request 735 to create payment information related to the request. The participant device 108 may generate a payment initiation response 745, which may include the information from the payment initiation request 735 as well as a payment initiation status determined by the participant device. 108. Possible payment initiation statuses may include a "Proceed" payment initiation status in an instance the participant device approves the payment initiation request. Other possible payment initiation statuses include a "Reject" payment initiation status in an instance the participant device denies the payment initiation request and/or a "Technical Error" payment initiation status in an instance the participant device experience an error with processing the payment initiation request.

The orchestrator device 200 may receive the payment initiation response 745 and update the corresponding request entry in the payment information list 705, which includes data from previous payment initiation responses. If the payment initiation status is a "Proceed" payment initiation status, the orchestrator device 200 may update a payment information status for the associated request entry to be "In Progress" and publish a new target participant listener topic with a new context identifier to update one or more participant devices. If the payment initiation status is a "Reject" payment initiation status, the orchestrator device 200 may update a payment information status to be "Cancelled" for the associated request entry and stop the payment initiation flow. If the payment initiation status is a "Technical Error" payment initiation status, the orchestrator device 200 may resend a payment initiation request to the participant device 108 until either a "Proceed" or "Reject" payment initiation status is received.

Figure 8:
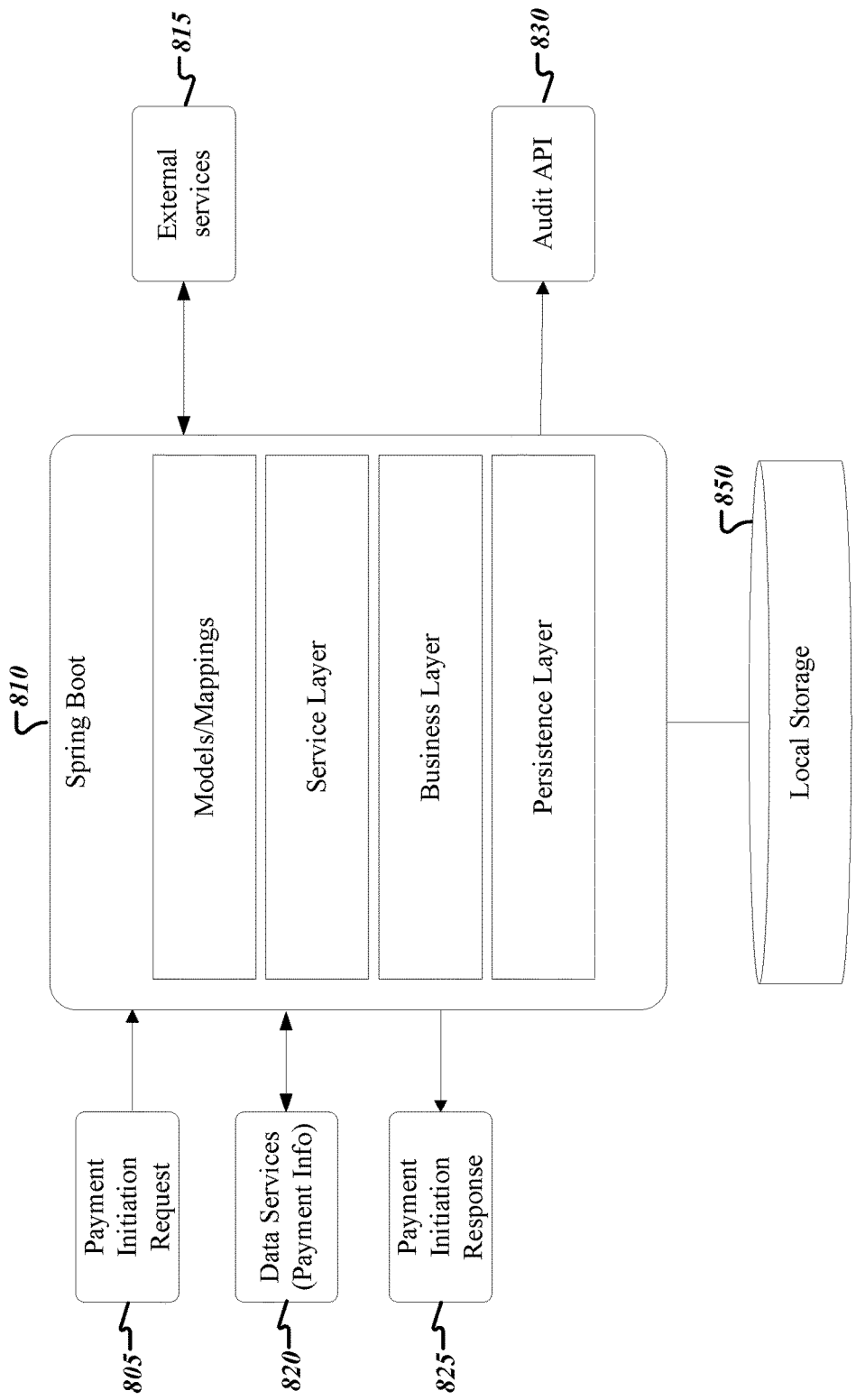
FIG. 8 provides an operational example of a participant device application architecture for a payment initiation workflow in accordance with at least one example embodiment of the present invention.

FIG. 8 illustrates an example system architecture for a participant device. A stream application 810 on a participant device may receive a payment initiation request 805 from an orchestrator device as described above in FIG. 7. The stream application 810 may be a Spring Boot framework that employs multiple sub-services such as models and/or mappings, a service layer, a business layer, and a persistence layer to process the payment initiation request. The stream application may then communicate with one or more external services 815, audit application program interfaces 830, and/or data services 820 to access payment information, rules data, or other data necessary to determine an appropriate payment initiation status. The stream application may then provide a payment initiation response 825, which includes the payment initiation status to the orchestrator device 200. The stream application may access and/or provide data to a local storage 850 associated with the participant device. As such, the participant device may use provided data to generate one or more user interfaces and/or notifications for the participant device.

Conclusion

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method for event-based payment orchestration, the method comprising:

receiving, via an orchestrator device, a request for a payment process configuration from a first participant device, wherein the orchestrator device comprises a plurality of payment process configurations stored locally by the orchestrator device, wherein each of the plurality of payment process configurations comprises configurable instructions for performing an associated portion of a payment process, wherein the request comprises a plurality of first participant requirement parameters;

determining a first payment process configuration based upon the plurality of first participant requirement parameters; and providing the first payment process configuration to the first participant device, wherein modifications to the first payment process configuration by the first participant device are stored locally by the first participant device.

2. The computer-implemented method according to claim 1, further comprising:

modifying one or more of the plurality of payment process configurations stored locally by the orchestrator device;

determining if the modification implicates the first payment process configuration; and transmitting a modification notification to the first participant device in an instance in which the modification implicates the first payment process configuration.

3. The computer-implemented method according to claim 1, further comprising:

receiving a request for a payment process configuration from a second participant device, wherein the request comprises a plurality of second participant requirement parameters;

determining a second payment process configuration based upon the plurality of second participant requirement parameters; and providing the second payment process configuration to the second participant device, wherein modifications to the second payment process configuration by the second participant device are stored locally by the second participant device.

4. The computer-implemented method according to claim 3, further comprising:

receiving an error notification associated with a payment process that includes operations by the first participant device and the second participant device;

accessing first operation data stored locally by the first participant device;

accessing second operation data stored locally by the second participant device; and determining an error source in either the first payment process configuration of the first participant device or the second payment process configuration of the second participant device based upon the first operation data and the second operation data.

5. The computer-implemented method according to claim 4, further comprising:

modifying one or more of the plurality of payment process configurations stored locally by the orchestrator device based upon the determined error source.

6. The computer-implemented method according to claim 1, further comprising:

modifying one or more of the plurality of payment process configurations stored locally by the orchestrator device in response to modification of the first payment process configuration by the first participant device.

7. The computer-implemented method according to claim 6, wherein the one or more of the plurality of payment process configurations are iteratively modified based upon modification of the first payment process configuration by the first participant device.

8. An apparatus for event-based payment orchestration comprising at least one processor and at least one memory, the at least one memory having computer-code instructions stored thereon that, when executed by the at least one processor, cause the apparatus to:

receive a request for a payment process configuration from a first participant device, wherein the apparatus comprises a plurality of payment process configurations stored locally by the apparatus, wherein each of the plurality of payment process configurations comprises configurable instructions for performing an associated portion of a payment process, wherein the request comprises a plurality of first participant requirement parameters;

determine a first payment process configuration based upon the plurality of first participant requirement parameters; and provide the first payment process configuration to the first participant device, wherein modifications to the first payment process configuration by the first participant device are stored locally by the first participant device.

9. The apparatus according to claim 8, wherein the computer-code instructions, when executed by the at least one processor, further cause the apparatus to:

modify one or more of the plurality of payment process configurations stored locally by the apparatus;

determine if the modification implicates the first payment process configuration; and transmit a modification notification to the first participant device in an instance in which the modification implicates the first payment process configuration.

10. The apparatus according to claim 8, wherein the computer-code instructions, when executed by the at least one processor, further cause the apparatus to:

receive a request for a payment process configuration from a second participant device, wherein the request comprises a plurality of second participant requirement parameters;

determine a second payment process configuration based upon the plurality of second participant requirement parameters; and provide the second payment process configuration to the second participant device, wherein modifications to the second payment process configuration by the second participant device are stored locally by the second participant device.

11. The apparatus according to claim 10, wherein the computer-code instructions, when executed by the at least one processor, further cause the apparatus to:

receive an error notification associated with a payment process that includes operations by the first participant device and the second participant device;

access first operation data stored locally by the first participant device;

access second operation data stored locally by the second participant device; and determine an error source in either the first payment process configuration of the first participant device or the second payment process configuration of the second participant device based upon the first operation data and the second operation data.

12. The apparatus according to claim 11, wherein the computer-code instructions, when executed by the at least one processor, further cause the apparatus to:

modify one or more of the plurality of payment process configurations stored locally by the apparatus based upon the determined error source.

13. The apparatus according to claim 8, wherein the computer-code instructions, when executed by the at least one processor, further cause the apparatus to:
modify one or more of the plurality of payment process configurations stored locally by the apparatus in response to modification of the first payment process configuration by the first participant device.

14. The apparatus according to claim 13, wherein the one or more of the plurality of payment process configurations are iteratively modified based upon modification of the first payment process configuration by the first participant device.

15. A computer program product for event-based payment orchestration, the computer program product comprising at least one non-transitory computer-readable storage medium storing computer program code that, when executed, causes an apparatus to:
receive, by an orchestrator device, a request for a payment process configuration from a first participant device, wherein the orchestrator device comprises a plurality of payment process configurations stored locally by the orchestrator device, wherein each of the plurality of payment process configurations comprises configurable instructions for performing an associated portion of a payment process, wherein the request comprises a plurality of first participant requirement parameters;
determine a first payment process configuration based upon the plurality of first participant requirement parameters; and
provide the first payment process configuration to the first participant device, wherein modifications to the first payment process configuration by the first participant device are stored locally by the first participant device.

16. The computer program product according to claim 15, wherein the computer program code, when executed, further causes the apparatus to:
modify one or more of the plurality of payment process configurations stored locally by the orchestrator device;
determine if the modification implicates the first payment process configuration; and
transmit a modification notification to the first participant device in an instance in which the modification implicates the first payment process configuration.

17. The computer program product according to claim 15, wherein the computer program code, when executed, further causes the apparatus to:
receive a request for a payment process configuration from a second participant device, wherein the request comprises a plurality of second participant requirement parameters;
determine a second payment process configuration based upon the plurality of second participant requirement parameters; and
provide the second payment process configuration to the second participant device, wherein modifications to the second payment process configuration by the second participant device are stored locally by the second participant device.

18. The computer program product according to claim 17, wherein the computer program code, when executed, further causes the apparatus to:
receive an error notification associated with a payment process that includes operations by the first participant device and the second participant device;
access first operation data stored locally by the first participant device;
access second operation data stored locally by the second participant device; and
determine an error source in either the first payment process configuration of the first participant device or the second payment process configuration of the second participant device based upon the first operation data and the second operation data.

19. The computer program product according to claim 18, wherein the computer program code, when executed, further causes the apparatus to:
modify one or more of the plurality of payment process configurations stored locally by the orchestrator device based upon the determined error source.

20. The computer program product according to claim 15, wherein the computer program code, when executed, further causes the apparatus to:
modify one or more of the plurality of payment process configurations stored locally by the orchestrator device in response to modification of the first payment process configuration by the first participant device.

\* \* \* \* \*